No. 664,748. Patented Dec. 25, 1900.
E. A. HILL.
RETAINING BAND FOR RUBBER TIRES.
(Application filed Mar. 9, 1900.)
(No Model.)
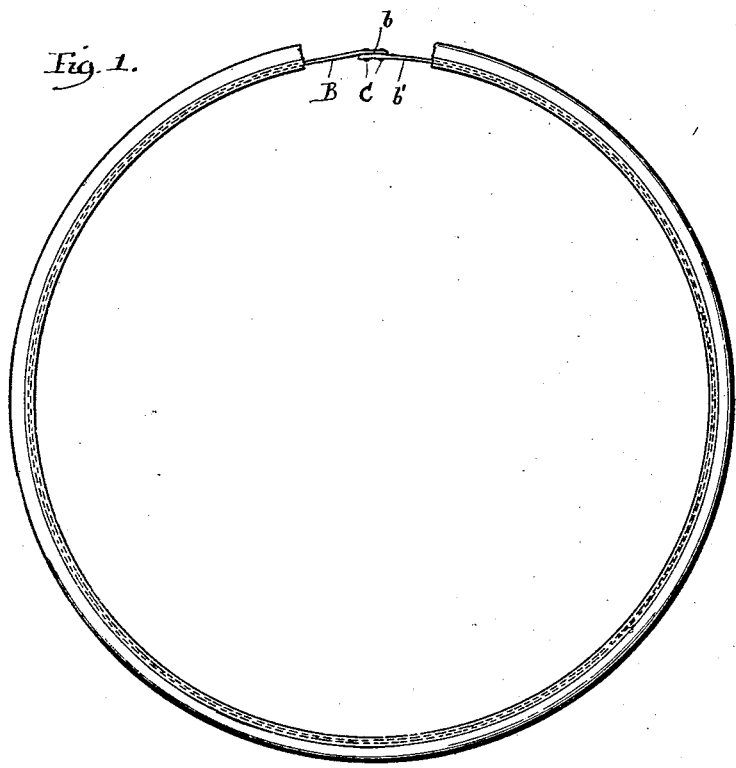
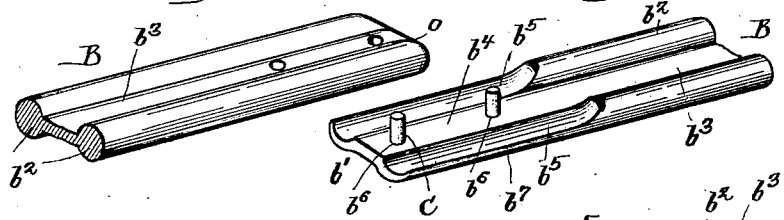
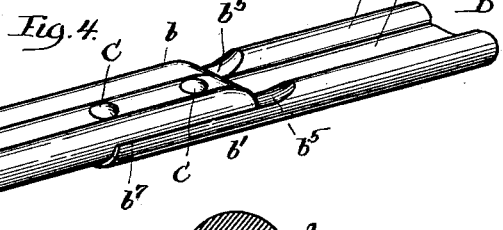
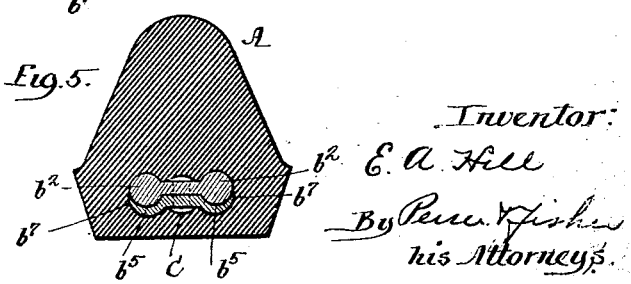
Witnesses:
Fred Gulack
Alberta Adamick
Inventor:
E. A. Hill
By Peirce & Fisher
his Attorneys.

UNITED STATES PATENT OFFICE.

EDGAR A. HILL, OF CHICAGO, ILLINOIS, ASSIGNOR TO THE CALUMET TIRE RUBBER COMPANY, OF SAME PLACE.

RETAINING-BAND FOR RUBBER TIRES.

SPECIFICATION forming part of Letters Patent No. 664,748, dated December 25, 1900.

Application filed March 9, 1900. Serial No. 7,964. (No model.)

*To all whom it may concern:*

Be it known that I, EDGAR A. HILL, a resident of the city of Chicago, in the county of Cook and State of Illinois, have invented certain new and useful Improvements in Rubber Tires for Vehicle-Wheels, of which the following is a full, clear, and exact description, reference being had to the accompanying drawings, forming a part of this specification.

This invention has relation to that class of rubber tires in which the body of rubber comprising the tire is held in position upon the periphery of the wheel by means of a retaining-band that passes through a suitable opening extending lengthwise throughout the body of the rubber. The most approved method of applying this class of tires to vehicle-wheels is to wrap the tire around the channel-iron of the wheel (the ends of the rubber being forced back to expose the ends of the retaining-band) and thereafter to cut off the excess portion of the retaining-band at one end and unite the ends of the band by a mechanical fastener, by electric welding, or by brazing.

In Letters Patent No. 640,000, granted to the Calumet Tire Rubber Company as assignee of Frank W. Kinney December 26, A. D. 1899, is shown a mechanical fastener for joining the ends of a retaining-band, and in the accompanying drawings I have shown my invention as applied to a retaining-band of the same shape as that illustrated in said Kinney patent, although without departing from the scope of my invention it may obviously be applied to other shapes of retaining-bands.

In connecting the ends of a tire retaining-band by a mechanical fastener it is the practice after setting the tire in position upon the wheel and drawing the retaining-band to the required tension to cut off the excess portion of the retaining-band and apply the fastener-plates to the opposite sides of the abutting ends of the band, after having previously punched the ends of the band with holes to receive the pins or rivets, whereby the sections of the fastener are connected to the band.

My present invention has for its object to avoid the necessity of employing separate fastener-plates for uniting the ends of the retaining-band, and this object I accomplish by so shaping one end of the band that it shall interlock with the opposite end of the band after the ends have been lapped in position to receive one or more rivets.

Figure 1 is a side view, upon a reduced scale, of a rubber tire embodying my invention. Fig. 2 is a perspective view of one end of the retaining-band. Fig. 3 is a perspective view of the opposite end of the retaining-band. Fig. 4 is a perspective view showing the ends of the retaining-band interlocked and fastened together. Fig. 5 is a view in cross-section through the tire at the joint.

A designates the body of rubber of which the tire is composed, and B denotes the retaining-band that passes through an opening of the rubber in the usual manner. One end $b$ of the retaining-band B is of the same shape as the body of said band; but the opposite end $b'$ of the band B is shaped to interlock with the end $b$ and aid in holding the band against lateral strains to which the tire is subjected when in use. As shown, the band B is the same as that set forth in the above-mentioned Kinney patent—that is to say, each side of the band is formed with thickened edges $b^2$, between which are the channels $b^3$.

The end $b'$ of the band is shown as formed with a central rib $b^4$ and with longitudinal grooves or seats $b^5$, the central rib entering the channel $b^3$ at one side of the band B, while the seats or grooves $b^5$ receive the thickened portions $b^2$ of the band and extend at each side of the end of the band. The end portion $b'$ of the retaining-band is formed with one or more holes $b^6$, through which pass the rivets C, adapted to enter corresponding holes that will be formed centrally of the opposite end $b$ of the band. In practice the mechanic in applying the band, after wrapping the tire around the channel-iron of the wheel, will cut off the excess length of the end $b$ of the band and will then punch one or more holes adapted to coincide with the corresponding holes in the opposite end of the band. The ends $b$ and $b^4$ will then be lapped together, and the rivets C having been passed through the holes will have their ends upset to securely retain the parts together.

In practice the retaining-bands will be shipped with the rivets C fixed in place in the ends $b'$ of the band, this fixing of the rivets being effected by forcing the rivets into the holes or in any other convenient manner. Inasmuch as the end $b$ of the band is held between the overlapping side edges $b^7$ of the end $b'$, it will be seen that these overlapping edges effectively aid in holding the band against the lateral strains to which in practice it must be subjected.

An advantage incident to my invention is that it not only reduces the cost of fastening the ends of the retaining band, but what is more important it materially lessens the labor of connecting the ends of the band, since the mechanic in applying a tire having my improved band need only punch one end of the band. Moreover, the joint may be made considerably less bulky than where two clamp-plates are used, and this is a matter of advantage, since in practice it is desirable to reduce the size of the joint as far as possible.

It will be understood that when the ends of the band have been joined together the extreme portion of the end $b$ will be beveled or rounded off by a file in order to prevent cutting or chafing the rubber.

Having thus described my invention, what I claim as new, and desire to secure by Letters Patent, is—

1. A retaining-band for an elastic tire formed from a rod or piece of uniform cross-section, said band having thickened edges and having one of its ends longitudinally recessed on one side by swaging the metal of the thickened edges to receive the lapping opposite end of the band at whatever point it may be severed.

2. A retaining-band for rubber tires, one end whereof is formed with a central rib and with longitudinal recesses or seats at the opposite sides of said central rib, the opposite end of the band being formed with thickened edges adapted to enter said longitudinal seats or recesses.

EDGAR A. HILL.

Witnesses:
 WALTER O. HILL,
 GRANT RIDGWAY.